United States Patent [19]

Fullenkamp et al.

[11] Patent Number: 5,348,326
[45] Date of Patent: Sep. 20, 1994

[54] CARRIER WITH DEPLOYABLE CENTER WHEELS

[75] Inventors: Eugene H. Fullenkamp, Batesville, Ind.; Richard H. Heimbrock, Cincinnati, Ohio; David Hensley, Milan; David W. Hornbach, Brookville, both of Ind.

[73] Assignee: Hill-Rom Company, Inc., Batesville, Ind.

[21] Appl. No.: 25,169

[22] Filed: Mar. 2, 1993

[51] Int. Cl.$^5$ .............................................. B62D 61/12
[52] U.S. Cl. ............................... 280/43.17; 280/43.18; 280/43
[58] Field of Search ............... 280/43.17, 43.18, 43.22, 280/43.23, 43.12, 250.1, 43; 296/20; 5/600

[56] References Cited

U.S. PATENT DOCUMENTS

| 1,110,838 | 9/1914 | Taylor | 296/20 |
|---|---|---|---|
| 1,118,931 | 12/1914 | Hasley | 188/5 |
| 1,483,607 | 2/1924 | Liedtke | 296/20 |
| 2,599,717 | 6/1952 | Menzies | 5/510 |
| 3,269,744 | 8/1966 | Dobson | 280/43.17 |
| 3,304,116 | 2/1967 | Stryker | 296/20 |
| 3,544,127 | 12/1970 | Dobson | 280/43.17 |
| 3,761,968 | 10/1973 | Besler | 5/503.1 |
| 3,838,687 | 10/1974 | Mosher | 128/200.11 |
| 4,164,355 | 8/1979 | Eaton et al. | 296/20 |
| 4,175,783 | 11/1979 | Pioth | 296/20 |
| 4,248,444 | 2/1981 | Johnson | 280/47.11 |
| 4,439,879 | 4/1984 | Werner | 5/600 |
| 4,579,381 | 4/1986 | Williams | 296/20 |
| 4,584,989 | 4/1986 | Stith | 600/18 |
| 4,629,242 | 12/1986 | Schrager | 296/20 |
| 4,706,329 | 11/1987 | Screen | 16/47 |
| 4,723,808 | 2/1988 | Hines | 296/20 |
| 4,922,574 | 5/1990 | Heiligenthal et al. | 16/35 R |
| 5,076,390 | 12/1991 | Haskins | 280/250.1 |
| 5,083,625 | 1/1992 | Bleicher | 180/65.1 |
| 5,090,070 | 2/1992 | Heinz | 5/611 |

FOREIGN PATENT DOCUMENTS

| 250239 | 6/1948 | Switzerland | 280/43.17 |
|---|---|---|---|
| 415450 | 8/1934 | United Kingdom | 280/43.17 |

Primary Examiner—Margaret A. Focarino
Assistant Examiner—Kevin Hurley
Attorney, Agent, or Firm—Wood, Herron & Evans

[57] ABSTRACT

A carrier for an object having castors at each corner and a steering system comprised of a fixed pair of spaced steering wheels deployable to contact the surface proximate the midpoint of the carrier. The pair of steering wheels are separated by a distance that improves tracking of the carrier and allows the carrier to more easily be turned around corners. A linkage is connected between a foot pedal and the pair of steering wheels; and the pair of steering wheels is moved into surface contact simultaneously with said castors contacting the surface by pressing the foot pedal.

28 Claims, 7 Drawing Sheets

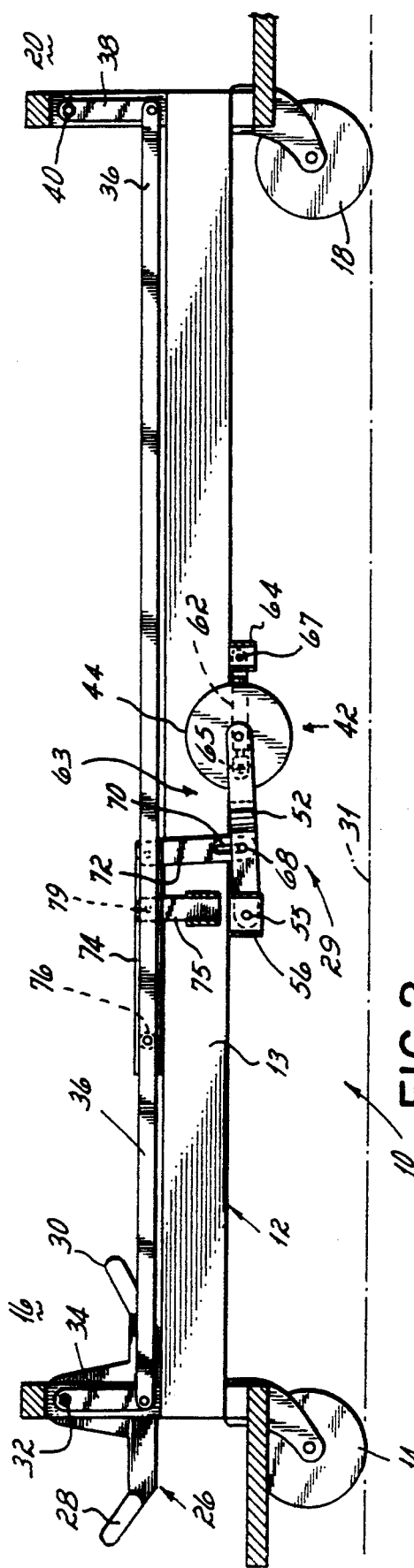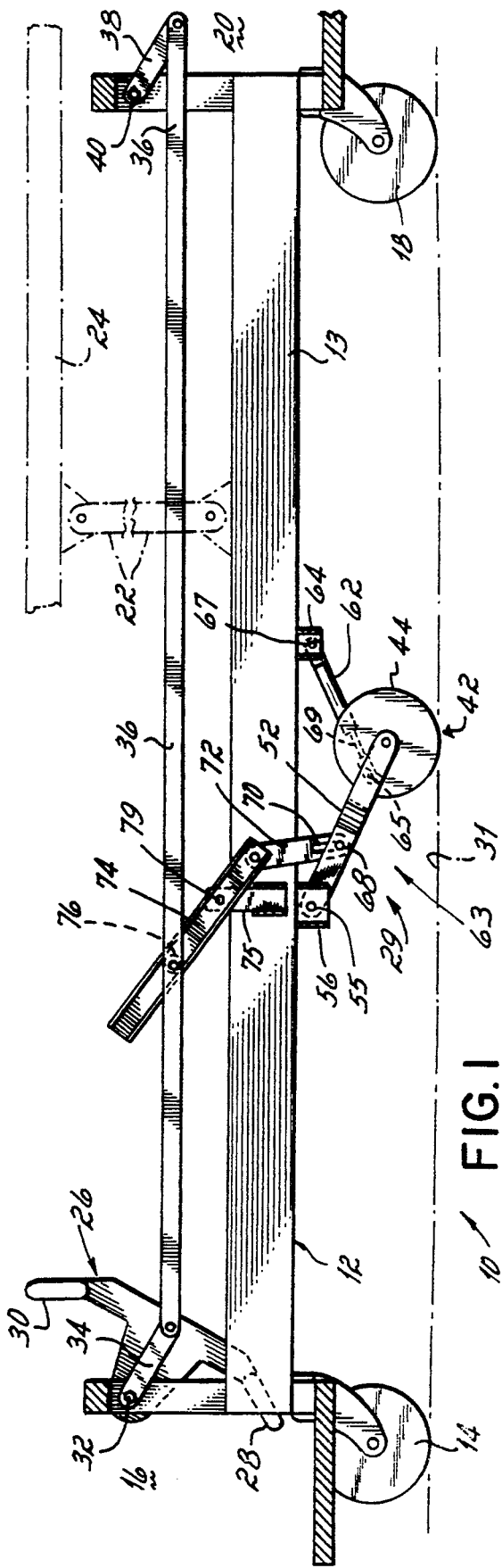

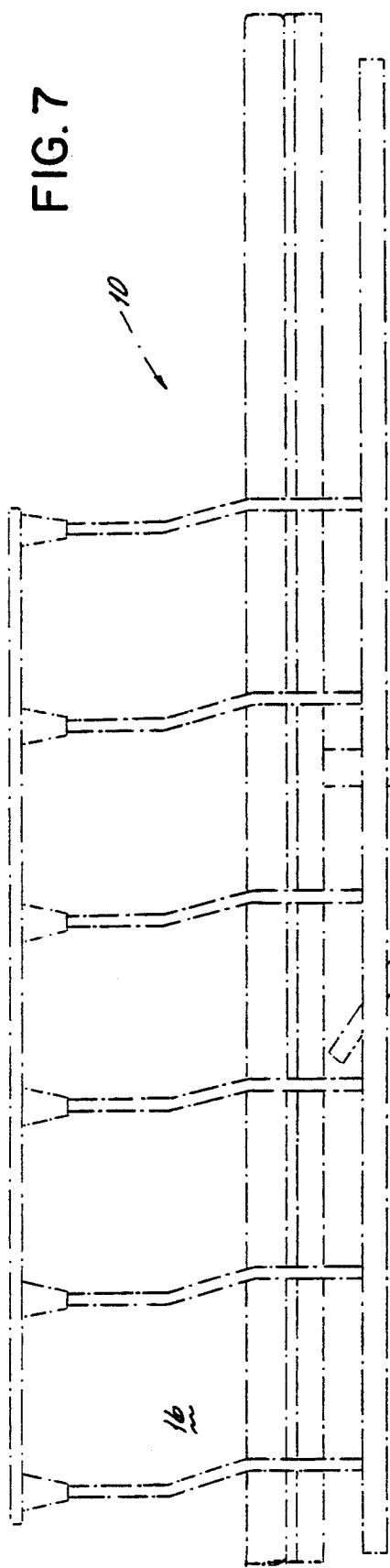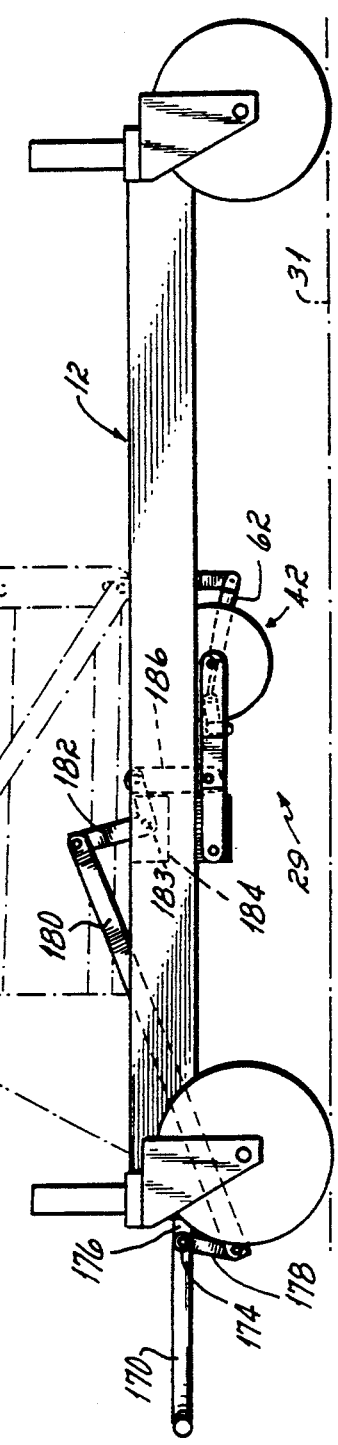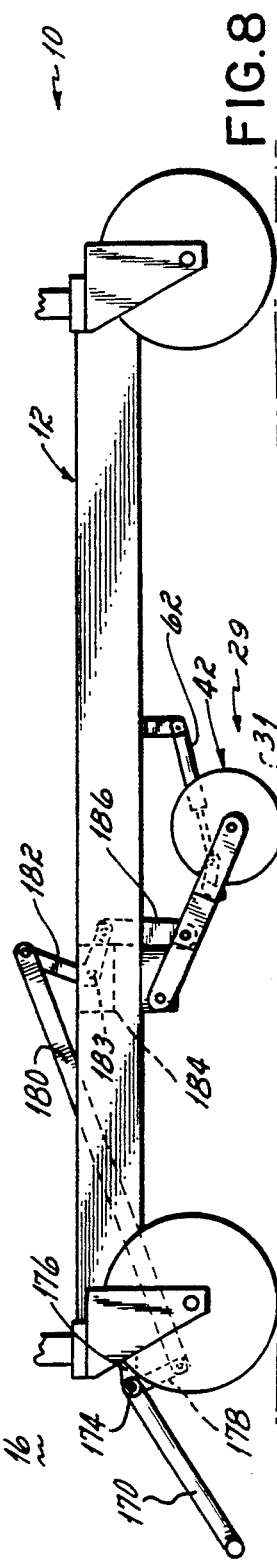

CARRIER WITH DEPLOYABLE CENTER WHEELS

BACKGROUND OF THE INVENTION

1. Field of the Invention

The present invention relates to a wheeled carrier and more particularly to a wheeled carrier with a deployable steering system comprised of a pair of steering wheels centrally located beneath the carrier.

2. BACKGROUND OF THE INVENTION

There is a continuing effort to improve the steering, that is, the tracking and maneuverability of unpowered wheeled carriers such as hospital beds, stretchers, etc. Typically, such carriers are rectangular in shape and contain castors, that is, swiveling wheels, located at the four corners. Such a wheeled carrier is difficult to handle along straight paths because the axes of the pivoting wheels are not maintained in any predetermined fixed relationship. Since the carrier will want to move in the direction of the rotation of a wheel, if the castors are pointed in different directions, the carrier will be pulled in those respective directions, and therefore the carrier will not have any fixed and predictable direction of motion. It is desirable that an operator be able to establish and maintain the path of motion of a carrier. For purposes of this specification, tracking will be defined as the tendency of a carrier to maintain an existing path of motion absent an operator force intended to cause the carrier to deviate from the existing path of motion.

Further, to steer or maneuver a carrier on castors around corners is difficult because there is no fixed pivot axis for turning the carrier. Therefore, the person(s) steering the carrier must, through significant effort, force the carrier to turn as desired.

In order to improve the tracking or maneuverability of such carriers, it is known to deploy one or more additional wheels. For example, as shown in U.S. Pat. No. 2,599,717, a hospital bed with a pair of castors at each end further has a pair of wheels located at the sides which may be lowered thereby lifting one of the pair of castors from the surface. The bed has improved handling for the transportation of a patient.

U.S. Pat. No. 3,304,116, discloses a deployable fixed axis fifth wheel located at the midpoint of a carriage which helps overcome the tendency of the carriage to drift sideways while the carriage is positioned for loading and unloading an object therefrom.

Other designs to facilitate handling include mechanisms to selectively brake one or more castors or to lock castors in a desired position after they have been manually adjusted to that position. Generally, because of the unpredictability of motion and the physical effort required to maneuver prior art carriers, two people are required to steer the carrier. While some designs have a single center wheel to assist turning, such designs have the disadvantage of not improving the tracking of the carrier. Further, other designs may be useful for improving tracking; but they have the disadvantage of being more difficult to turn the carrier through a minimum turning radius, that is, turning the carrier about a pivot point defined by the midpoint of the carrier.

SUMMARY OF THE INVENTION

To overcome the disadvantages of existing carriers, a primary object of the invention is to provide a steering system for a carrier in which both tracking of the carrier is improved without unduly compromising the turning radius of the carrier.

According to the principles of the present invention and in accordance with the presently preferred embodiment, a carrier having a supporting frame with a pair of castors at both ends includes a deployable pair of spaced steering wheels having an axis of rotation perpendicular to a longitudinal axis of the carrier. Resilient biasing means are used to bias the pair of spaced steering wheels into contact with a surface. A deployment mechanism permits the steering wheels to be manually moved selectively in vertically upward and downward directions. The deployment mechanism is comprised of a pedal actuated mechanism pivotally connected to the frame and linkage connected between the pedal actuated mechanism and a wheel support. The linkage moves the pair of wheels in selectable vertically upward and downward directions in response to the pedal actuated mechanism. The linkage further comprises a connecting rod having one end pivotally connected to the pedal actuating mechanism and a pivot link in mechanical communication with the other end of the connecting rod and the wheel support. The linkage is effective to direct the steering wheels to points of contact with the surface that are on a line approximately equidistant from the ends of the frame. The biasing means is further operative to hold the steering wheels out of contact with the surface in response to the linkage moving the wheel support in a vertically upward direction. The biasing means is comprised of a gas spring or compression springs.

An advantage of the present invention is that the pair of steering wheels have a spacing which improves the tracking of the carrier and permits the carrier to more easily be turned through a corner. Further, the pair of steering wheels are centrally located to improve the balance and handling of the carrier. Each of the pair of steering wheels is spaced equally from the carrier midpoint so that the carrier may be easily turned with the minimum turning radius. The biasing mechanism provides a contact force between the wheels and the surface; and the biasing means is resilient to improve traction over uneven or rough surfaces, thereby improving tracking and maneuverability. Therefore, the carrier of the present invention is more easily operated by a single person.

These and other objects and advantages of the present invention will become more readily apparent during the following detailed description taken in conjunction with the drawings herein.

BRIEF DESCRIPTION OF THE DRAWINGS

FIG. 1 is a side-elevational schematic view of a first embodiment of a carrier with the pair of wheels deployed into contact with the surface.

FIG. 2 is a side-elevational schematic view of the first embodiment of the carrier with the pair of wheels in a retracted position.

FIG. 7 is a partial side schematic view illustrating a third embodiment of a deployment mechanism with the pair of wheels shown in a retracted position.

FIG. 8 is a partial side schematic view of the third embodiment with the pair of wheels shown in the deployed position.

DETAILED DESCRIPTION OF THE INVENTION

Figure 3:
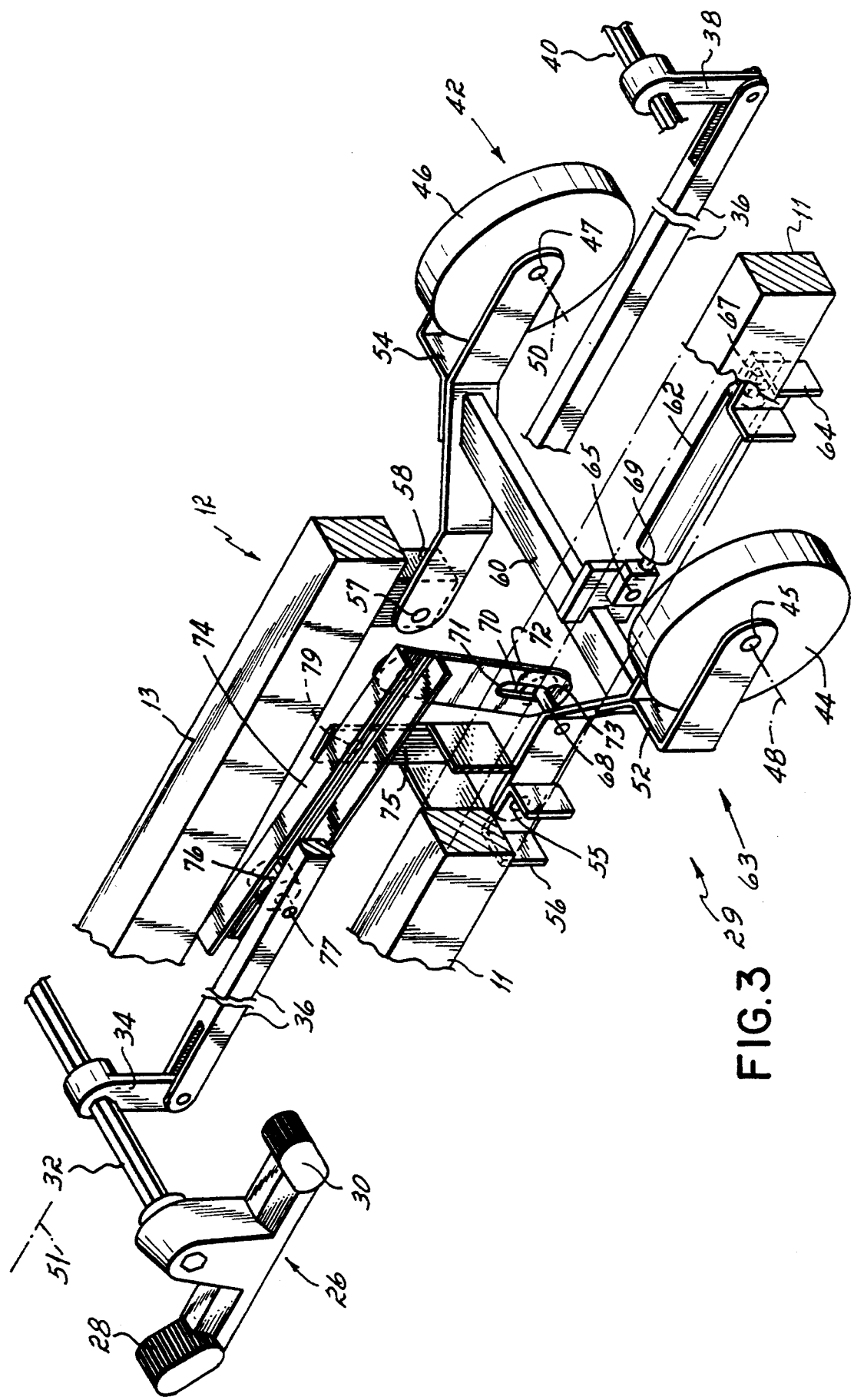
FIG. 3 is a partial perspective schematic view of the first embodiment of the invention showing the steering wheels in a the retracted position.

The steering system of the invention is preferably applied to a carrier such as a stretcher, a bed or other wheeled carrier for supporting a body. FIGS. 1–3 illustrate a first embodiment of the steering system of the invention. A carrier 10 is comprised of a frame assembly 12 supported by a first pair of castors 14 at the head 16 of the carrier 10. A second pair of castors 18 is located at the foot 20 of the carrier 10. Shown in phantom is a mechanism 22 for connecting a body support member 24 to the frame assembly 12 of the carrier 10. The body support member 24 and its associated mechanism 22, are well known in the art and will vary depending on whether the carrier is a bed, a stretcher or other device. In the embodiment of FIG. 1 the deployment of the steering system is controlled by pedals and linkages in common use on existing A pedal 26 is located in the proximity of one of the castors 14. However, pedals to actuate the steering system 29 may be located at any point on the periphery of the carrier. Typically, a pedal identical to the pedal 26 is located in the proximity of each of the castors. The pedal 26 provides selective dual actions to operate either a brake engaging mechanism or the steering mechanism for the carrier. The brake engaging mechanism is of a conventional type found on hospital beds and stretchers and utilizes many of the same components that are used to deploy the steering wheels. The pedal 26 has a steering actuating pad 28 at one end and a brake actuating pad 30 at its other end. Either pad may be used to bring the pedal back to its neutral horizonal position. For purposes of this specification, the pedals are to be considered manually operable. Manually operable refers to any unpowered action or operation.

Depressing the steering actuating pad 28 of the pedal 26 is effective to deploy the steering system 29 into contact with the surface 31 as shown in FIG. 1. The pedal 26 is connected to a hexagon shaped rod 32 mounted for rotation on the frame assembly 12 at the head 16 of carrier 10. A pivot link 34 is connected to the rod 32 such that rotation of the rod 32 through an angular displacement provides an identical rotation of the pivot link 34. The other end of the pivot link 34 is pivotally connected to one end of a connecting rod 36. The connecting rod 36 extends substantially the full length of the frame assembly 12 and has a second end pivotally connected to one end of a second pivot link 38. The other end of the second pivot link 38 is rigidly connected to a second hexagon shaped rod 40 which is connected to pedals (not shown) at the foot 20 of the carrier 10.

As steering pad 28 is depressed, the pedal 26, the first rod 32, the first pivot link 34, second pivot link 38 and the second rod 40 pivot through a first displacement, that is, an angle of rotation of approximately 45°. The rotation of the pivot links 34 and 38 is effective to move the ends of the connecting rod through the same angle of rotation. Therefore, the connecting rod 36 moves through in a vertically upward motion; and this vertically upward motion of the connecting rod is used to deploy the steering system 29.

As best shown in FIG. 3, the steering system 29 is comprised of a pair of spaced steering wheels 42. The pair of steering wheels is comprised of a first wheel 44 and a second wheel 46 mounted to rotate freely on axles 45 and 47 representing first and second axes of rotation 48 and 50, respectively, that are parallel and preferably co-linear. The steering wheels 44 and 46 are made of a soft durometer rubber or urethane with multiple annular grooves running around the tread in contact with surface 31 to increase friction with the surface 31 thereby preventing the wheels from skidding sideways when steering the carrier around a corner. To obtain a reasonable area of surface contact, wheel diameters may range from 3 inches (76 mm) to 8 inches (203 mm), but a wheel diameter of 5 inches (127 mm) is preferred. The axles 45 and 47 are mounted in first and second wheel yokes 52 and 54, respectively, such that the axes of rotation of the wheels is approximately perpendicular to a longitudinal axis 51 of the frame assembly 12. The first and second wheel yokes 52 and 54 are pivotally connected to first and second pivot pins 55 and 57 which are connected to first and second brackets 56 and 58, respectively, mounted to the frame assembly 12. A crossbar 60 is rigidly connected between the first and second wheel yokes 52 and 54 and together therewith form a yoke assembly 63 functioning as a wheel support to hold the axles 45 and 47 and the pair of wheels 42. A gas cylinder or gas spring biasing mechanism 62 has one end of a piston rod 69 pivotally connected to pivot pin 65 which is attached to the crossbar 60. An opposite end of cylinder 62 is pivotally attached to a pivot pin 67 connected to a third bracket 64, which is mounted to the frame assembly 12. The gas cylinder 62 is constructed to provide a force pushing piston rod 69 out of cylinder 62; and therefore the gas cylinder 62 is effective to force first and second wheels 44 and 46 toward and into contact with the surface 31. The gas spring also operates as a shock absorber in that the biasing force is resiliently applied thereby permitting the pair of steering wheels to track differences in elevation of the surface 31.

A thrust pin 68 is mounted on the first wheel yoke 52 and is received by a slot 70 in a slotted pivot link 72. The slotted pivot link 72 is pivotally connected to a pivot channel 74. The pivot channel is pivotally connected to pivot pin 79 connected to a fourth bracket 75 attached to frame member 11. The pivot channel is U-shaped and receives a roller 76 rotationally connected to a fixed pin 77 which is attached to the connecting rod 36. The roller 76 is connected to the fixed pin 77 by means of a ball or roller bearing.

To deploy the steering system 29 and extend the pair of wheels 44 and 46 into contact with the surface 31, the steering actuating pad 28 is depressed. The pressing of the pad 28 in a downward direction rotates the pedal 26, the first and second rods 32 and 40, and the first and second pivot links 34 and 38 in a counterclockwise direction. That action effects a vertically upward motion of the connecting rod 36, roller 76 and one end of the pivot channel 74. The vertically upward motion of one end of the pivot channel 74 rotates the pivot channel 74 clockwise about the pin 79. That action causes the other end of the pivot channel and slotted pivot link 72 to move in a vertically downward direction which continues until the thrust pin 68 engages an upper end 71 of slot 70. Continued vertically downward motion of the slotted pivot link 72 will cause the yoke assembly 63 to rotate clockwise about pivot pins 55 and 57 until the yoke assembly passes a horizontal position. At that point, the yoke assembly 63 will be moved downward by the combined action of the actuation of pedal 26, the operation of the gas cylinder 62 and gravity. Downward motion continues until the pair of steering wheels contact the surface 31, and they are held in contact with the surface 31 by the force applied by the gas cylinder 62. As the pair of wheels moves over depressions and rises in the surface 31, the gas cylinder 62 applies a resilient biasing force to maintain the pair of steering wheels 42 in constant contact with the surface 31. When the pair of wheels is in contact with the surface, the weight of the carrier and the object on the carrier is supported by the castors which remain in contact with the surface simultaneously with the pair of wheels.

A nonswiveling pair of freely rotating spaced steering wheels provide excellent tracking either when moving along a straight path or around a corner. The pair of steering wheels 42 contact the surface 31 at points on a line approximately equidistant from the pairs of castors 14 and 18 and equidistant from the longitudinal axis 51. Therefore, preferably, the carrier midpoint is centrally located between the pair of steering wheels. The force applied by the biasing mechanism on the pair of wheels is in the range of 300 newtons to 500 newtons, and preferably is 400 newtons. The pair of steering wheels are spaced far enough apart to provide improved tracking but are close enough together to more easily turn corners and turn the carrier with the minimum turning radius. The spacing between the wheels 44 and 46 may typically range from 9 inches (229 mm) to 15 inches (381 mm), but a spacing of 11 inches (279 mm) is preferred.

The steering wheels may be retracted from the surface by rotating the pedal 26 back to its generally horizontal orientation. That may be accomplished by moving either pedal pad 28 or 30 in a clockwise direction. As the pedal is moved through a displacement from the steering actuated position shown in FIG. 1 to the neutral position shown in FIG. 2, the pedal 26, the rods 32 and 40 and first and second pivot links 34 and 38 are rotated clockwise. The connecting rod 36 and the one end of the pivot channel 74 is moved in a vertically downward direction which results in the pivot channel pivoting about pin 79. The other end of pivot channel 74 and slotted pivot link 72 move in a vertically upward direction until the other end 73 of slot 70 engages thrust pin 68. Continuing vertically upward motion rotates the yoke assembly 63 counterclockwise about the pivot pins 55 and 57, thereby moving the pair of steering wheels 42 vertically upward out of contact with surface 31. The rotation continues until the axles 48 and 50 pass the vertical position of the pivot pins 55 and 57, and the crossbar 60 contacts frame members 11 and 13. At that point, the first and second wheel yokes 52 and 54 extend in a slightly vertically upward direction from the pivot pins 55 and 57; and that position is maintained by the force applied by the gas cylinder 62. FIG. 2 illustrates the fully retracted position of the yoke assembly 56.

Figure 4:
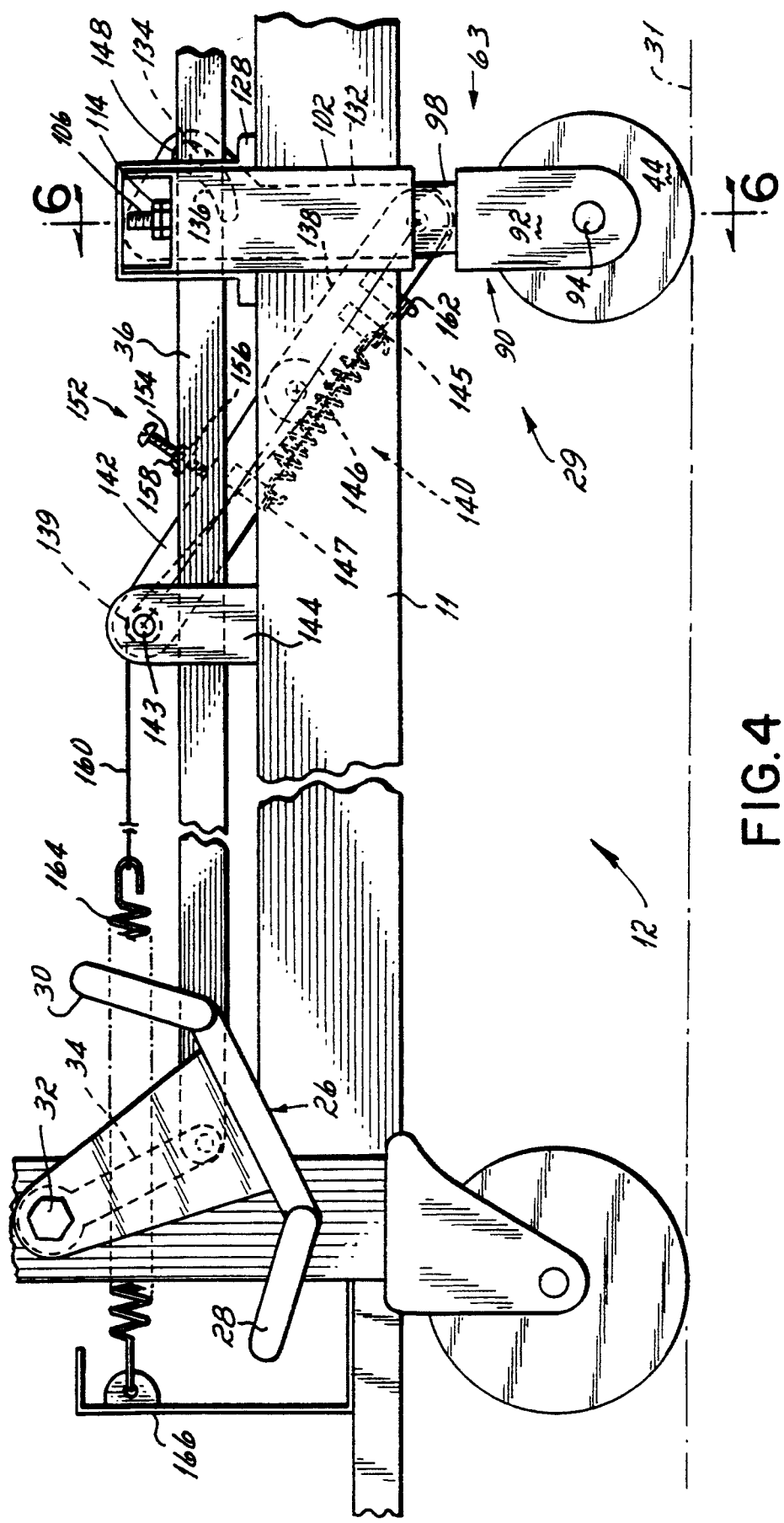
FIG. 4 is a partial side schematic view illustrating a second embodiment of a deployment mechanism extending the pair of wheels into contact with the surface.
Figure 5:
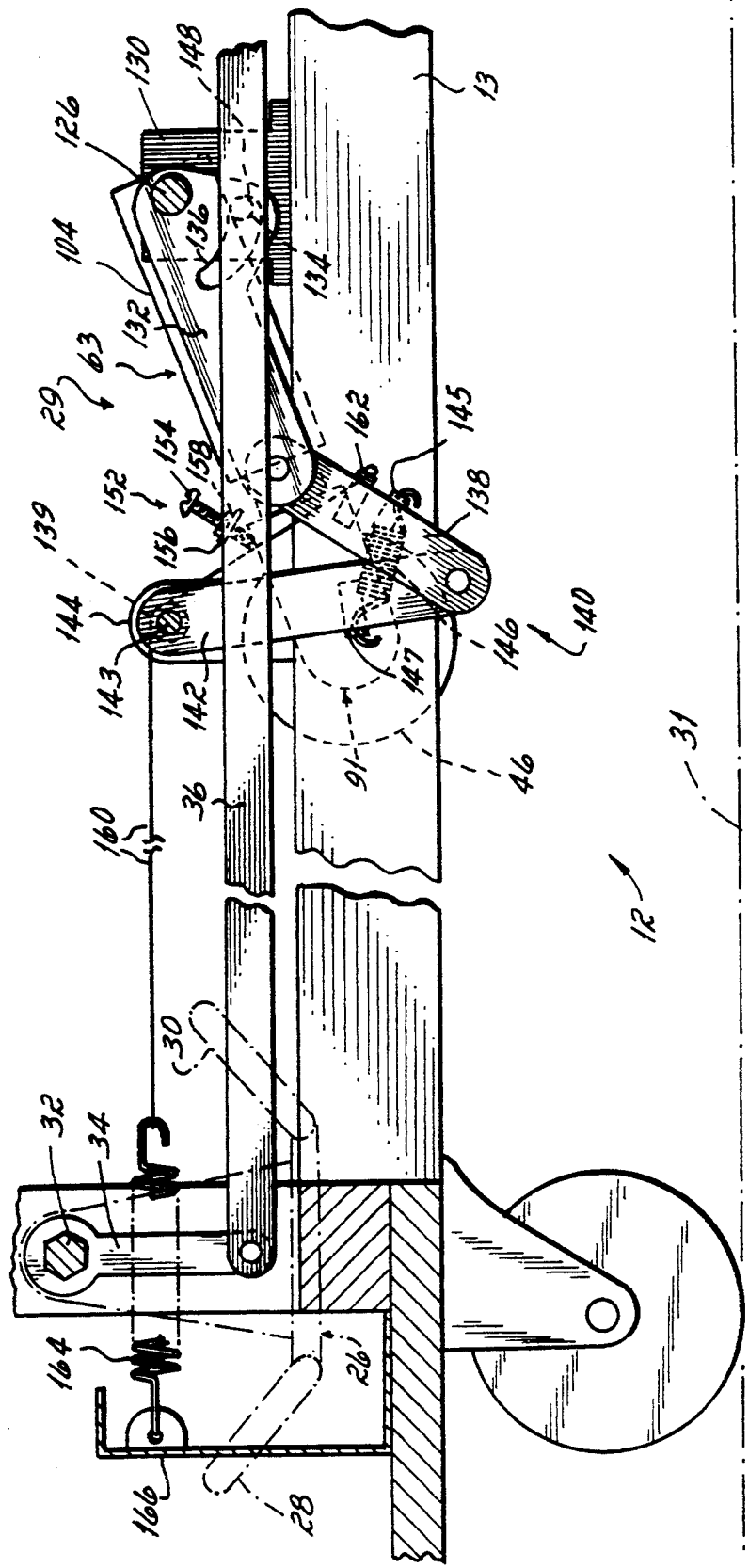
FIG. 5 is a partial side schematic view of the second embodiment with the pair of wheels in a retracted position.
Figure 6:
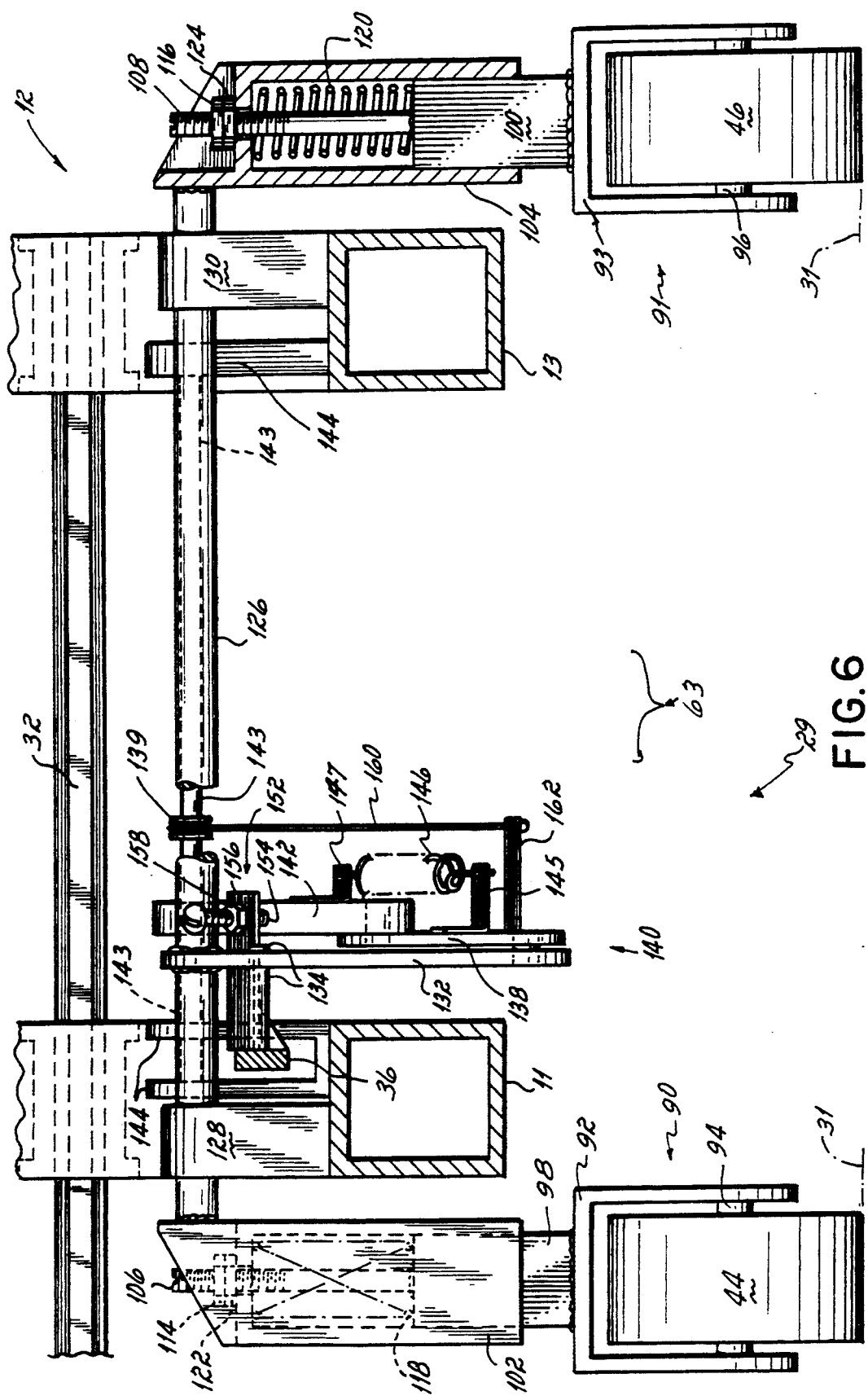
FIG. 6 is a cross-sectional view taken along lines 6—6 of FIG. 4 and illustrates independent shock absorbers for each wheel.

FIGS. 4, 5 and 6 demonstrate an alternative embodiment of the apparatus. This embodiment differs from the first one by utilizing a different deployment mechanism and individual resilient biasing mechanisms for each of the steering wheels. The pedal 26, rod 32, first pivot link 34, and connecting rod 36 operate as previously described. The embodiment may contain a second pivot link, rod and other pedal(s) (not shown). Referring to FIG. 6, the second embodiment of the yoke assembly 63 utilizes a pair of steering wheels 44 and 46 rotatably mounted on axles 94 and 96 in the first and second wheel yoke assemblies 90 and 91, respectively. The wheel yoke assemblies 90 and 91 include first and second yokes 92 and 93, respectively. The axles define axes of rotation for the wheels which are parallel and preferably collinear. The first and second wheel yoke assemblies 90 and 91 further include first and second yoke posts 98 and 100 mounted on the top of the first and second yokes, 92 and 93, respectively. The yoke posts 98 and 100 are square in cross-section and are slidably mounted within respective first and second tubes 102 and 104. Each of the tubes 102 and 104 is generally square and is closed at its upper end with a centrally located clearance hole. The clearance holes in the tubes 102 and 104 receive first and second threaded bolts 106 and 108, respectively. The bolts 106 and 108 are rigidly connected to yoke posts 98 and 100.

First and second compression springs 118 and 120 are located within respective first and second tubes 102 and 104. The springs 118 and 120 are held between the top surfaces of the yoke posts 98 and 100 and the closed upper ends of the tubes 102 and 104. First and second adjusting nuts 122 and 124 are threaded onto the first and second bolts 106 and 108 and are positioned to contact the outer top surfaces of the upper ends of the tubes 102 and 104. By turning the adjusting nuts 122 and 124, the yoke assemblies 90 and 91 are individually moved in a vertical direction; and this vertical adjustment is used to provide the desired vertical position of the steering wheels 44 and 46 with respect to surface 31 with the carrier unloaded. In addition, the adjusting nuts 122 and 124 may be used to adjust the initial bias of the compression spring so that when the carrier is fully loaded the compression springs will permit the yoke posts 98 and 100 to move within the tubes 102 and 104 in response to irregularities in surface 31. First and second locking nuts 114 and 116 are tightened against first and second adjusting nuts 122 and 124 to lock the adjusting nuts 122 and 124 into a position. With the second embodiment, each of the steering wheels 44 and 46 has an independent biasing mechanism which applies a downward force on each of the wheels so that the wheels adjust to the irregularities in the surface 31. The tubes 102 and 104 within the yoke assemblies 90 and 91, are rigidly connected to opposite ends of a cross rod 126. The cross rod 126 is rotatably mounted in first and second support blocks 128 and 130 which are connected to frame numbers 11 and 13, respectively. The support blocks 128 and 130 are preferably made of a plastic material.

One end of drive link 132 is rigidly connected to the cross rod 126. The connecting rod 36 has a roller pin 134 rigidly fixed thereto. The roller pin 134 is located on the connecting rod 36 at a position such that the roller pin 134 is received by an arcuate slot 136 in the drive link 132. Consequently, depressing the steering pad 28 will result in the roller pin 34 moving through an arcuate path resulting from the longitudinal and vertical motion of the connecting rod 36. The arcuate slot 136 in the drive link 132 conforms to the arcuate path of the roller pin 134. The other end of the drive link 132 is pivotally connected to one end of the first arm element 138 of locking arm 140. The other end of the first arm element 138 is pivotally connected to one end of the second arm element 142, and the other end of the second arm element 142 is pivotally connected to pivot rod 143 connected to brackets 144 which are attached to frame members 11 and 13. The locking arm 140 further includes a first tension spring 146 having one end connected to a post 145 on the first arm element 138 and an opposite end connected to a post 147 on the second arm element 142.

When the pedal 26 is in the neutral position, as shown in FIG. 5, the steering system 29 is in its retracted position. To deploy the steering system, the steering pedal pad 28 is depressed rotating the pedal 26, the first rod 32 and first pivot link 34 counterclockwise, as illustrated in FIG. 4. The connecting rod 36 is moved horizontally to the right as viewed in FIG. 4 and vertically upward. The roller pin 134 engages one end 148 of the arcuate slot 136. Continued motion of the connecting rod 36 causes roller pin 134 to pivot drive link 132, cross rod 126, and yoke assemblies 90 and 91 about an axis of rotation defined by the centerline of cross rod 126. The first and second arm elements 138 and 142 pivot with respect to each other, the other end of the drive link 132 and pivot rod 143 on bracket 144, and the first and second arm elements 138 and 142 are moved from their folded configuration as illustrated in FIG. 5, to an unfolded configuration as shown in FIG. 4. The first and second arm elements 138 and 142 are inhibited from further motion upon the element 142 contacting an adjustable stop 152 connected to the connecting rod 36. The adjustable stop 152 is comprised of a screw 154 threaded through a bracket 156 which is attached to connecting rod 36. A locking nut 158 is used to lock the position of the screw 154 at its desired position. Preferably, the adjustable stop 152 is set to a position where the first and second arm elements 138 and 142 have moved past a co-linear position and are beginning to fold in a vertically upward direction. The tension spring 146 is stretched thereby providing a force to hold the first and second arm elements 138 and 142 in the stopped position.

A cable 160 has one end attached to a post 162 on the first arm element 138, runs over a pulley 139 and has its other end connected to one end of a second tension spring 164. The other end of tension spring 164 is connected to a cross frame member 166. When the steering wheel assembly is fully deployed as illustrated in FIG. 4, the tension spring 164 is extended to apply a force to pull the steering wheel assembly back to its retracted position. The retracted position illustrated in FIG. 5 is achieved by moving the pedal 26 to the neutral position defined by a generally horizontal orientation. As the pedal is returned to the neutral position, the pedal 26, rod 32 and first pivot link 34, are rotated clockwise. That moves the roller pin 134 on connecting rod 36 through an arcuate path horizontally to the left and vertically downward as viewed in FIG. 4. That motion of the connecting rod 36 causes the adjustable stop 152 to pivot the second arm element 142 clockwise about the pivot rod 143. When the first and second arm elements 138 and 142 move past their collinear position and begin to fold in a vertically downward direction, the forces applied by the tension springs 146 and 164 are effective to pivot the arm elements 138 and 142, drive link 132, rod 126 and wheel yoke assemblies 90 and 91 toward the retracted position. When in the retracted position as demonstrated in FIG. 5, the retracted position is maintained by the tension spring 164. The arcuate slot 136 permits the motion of pin 134 as a result of depressing the brake pedal pad 30 and moving the connecting rod 36 in a generally leftward direction.

Figure 9:
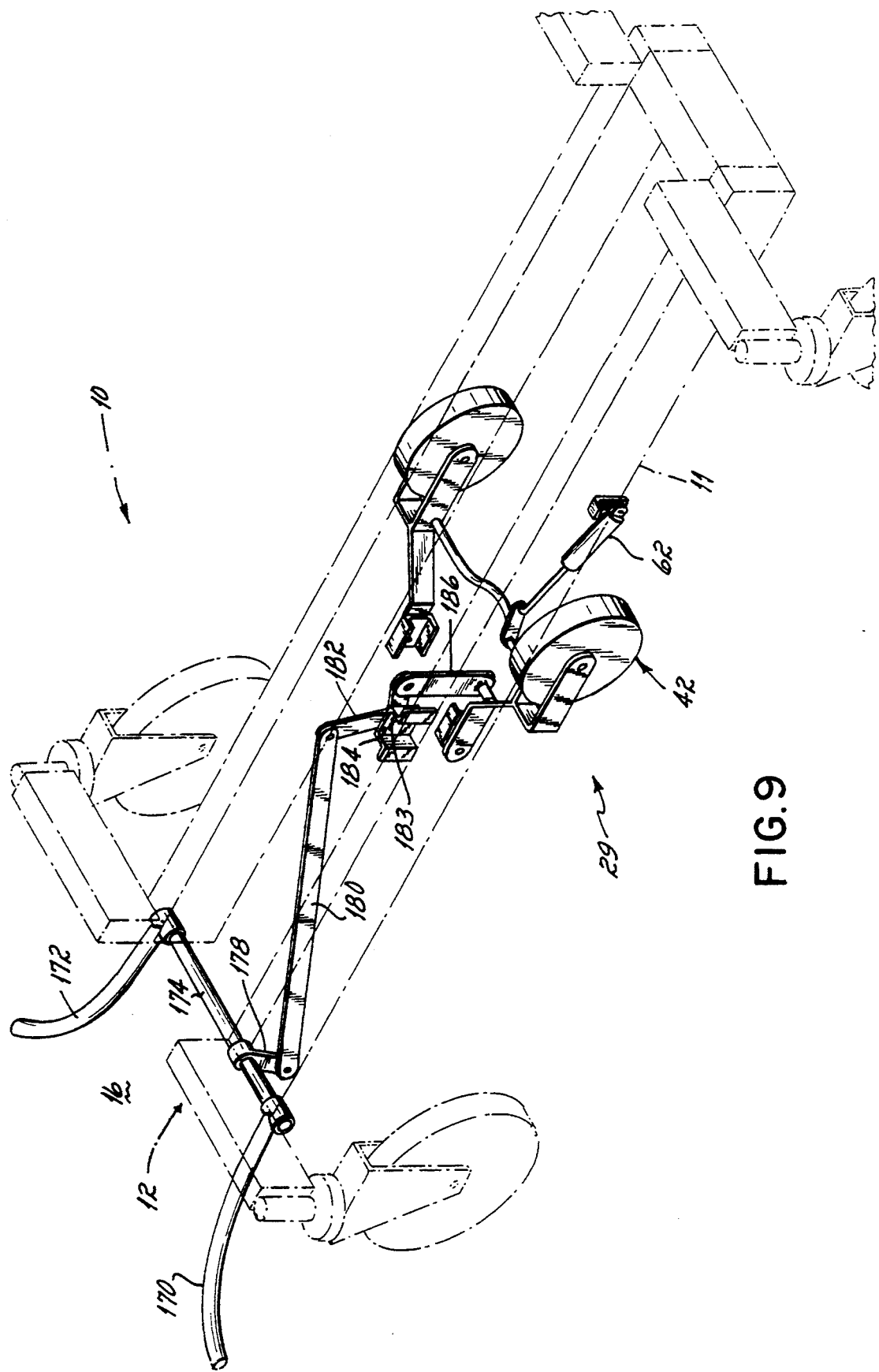
FIG. 9 is a partial perspective schematic view of the third embodiment illustrating the wheels in a retracted position.

FIGS. 7–9 illustrate a third embodiment of the invention. In this embodiment the yoke assembly is identical to the yoke assembly described in FIGS. 1–3. This embodiment differs in that a different mechanism is utilized to deploy the steering wheels. Instead of using the combination brake and steering pedal and deployment mechanism previously described, the third embodiment illustrates a dedicated steering pedal arrangement. Steering pedals 170 and 172 are located proximate the castors at the head 16 of the carrier 10. Steering pedals may be located anywhere around the periphery of the carrier. Further, only a single pedal may be used. Steering pedals 170 and 172 are rigidly connected to opposite ends of a crossbar 174 which is rotatably mounted in support 176 connected to the frame assembly 12. One end of a pivot arm 178 is rigidly connected to the crossbar 174, and the opposite end of pivot arm 178 is pivotally connected to one end of a connecting arm 180. The other end of the connecting arm 180 is pivotally connected to motion transfer link 182. Motion transfer link 182 is L-shaped, and the corner of motion transfer link 182 is pivotally connected to pivot pin 183 on bracket 184 which is attached to frame member 11. The other end of the motion transfer link is pivotally connected to one end of drive arm 186.

Clockwise rotation of motion transfer link 182 moves drive arm 186 in a vertically downward direction. When the steering system 29 passes a horizontal position, the actuation of the pedals 170, 172, the gas cylinder 62 and gravity combine to bring the pair of steering wheels into contact with the surface 31. That contact is maintained by the gas cylinder 62. To retract the pair of steering wheels, either of the steering pedals 170 or 172 is moved back toward a generally horizontal position by pivoting the pedals, crossbar 174 and pivot arm 178 in a clockwise direction. That action moves connecting arm 180 generally to the left as viewed in FIGS. 7 and 8, thereby imparting a counterclockwise rotation of motion transfer arm 182 and a vertically upward motion of drive arm 186. The steering system 29 is pulled to its retracted position by the vertically upward motion of the drive arm 186. The gas cylinder 62 is effective to hold the steering system in its retracted position.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations and equivalents falling within the spirit and scope of the appended claims.

What is claimed is:

1. A carrier for transporting an object over a surface comprising:

a frame for supporting the object, said frame having a longitudinal axis;

a plurality of castors connected to opposite ends of said frame and in contact with the surface for moving the carrier over the surface;

a pair of spaced steering wheels having a spacing therebetween which improves tracking of the carrier and which permits the carrier to more easily turn corners with a minimum turning radius; and wheel support means pivotally connected to said frame for rotatably supporting said pair of steering wheels relative to an axis of rotation approximately perpendicular to said longitudinal axis of said frame and for maintaining said pair of steering wheels in contact with the surface simultaneously with said plurality of castors.

2. The carrier of claim 1 wherein said pair of steering wheels has a spacing in the approximate range of from 9 inches (229 mm) to 15 inches (381 mm).

3. A carrier for transporting an object over a surface comprising:

a frame for supporting the object, said frame having a longitudinal axis;

castors connected to said frame and in contact with the surface for moving the carrier over the surface;

a pair of spaced steering wheels in contact with the surface simultaneously with said castors, said pair of steering wheels having a spacing therebetween which improves tracking of the carrier and which permits the carrier to more easily turn corners with a minimum turning radius;

wheel support means pivotally connected to said frame for supporting said pair of steering wheels and permitting said pair of steering wheels to rotate freely about an axis of rotation approximately perpendicular to said longitudinal axis of said frame; and resilient biasing means connected between said frame and said wheel support means for biasing said pair of steering wheels into contact with the surface.

4. The carrier of claim 3 further comprising deployment means connected between said wheel support means and said frame for manually moving said pair of steering wheels in a generally vertical direction.

5. The carrier of claim 4 wherein said biasing means biases said pair of steering wheels out of contact with the surface in response to the deployment means manually moving said pair of steering wheels in a generally upward direction, and biases said pair of steering wheels into contact with the surface in response to said deployment means moving said pair of steering wheels in a generally downward direction.

6. The carrier of claim 5 wherein said deployment means further comprising:

pedal means pivotally connected to said frame for selectively moving through first and second displacements; and linkage means connected between said pedal means and said wheel support means for moving said wheel support means in said generally downward direction in response to said pedal means moving through said first displacement, and for moving said wheel support means in said generally upward direction in response to said pedal means moving through said second displacement.

7. The carrier of claim 6 wherein said pedal means is connected to a steering actuator and a braking actuator.

8. The carrier of claim 6 wherein said pedal means further comprising a pivot point moving through first and second arcuate paths in response to said pedal moving through said first and second displacements, respectively.

9. The carrier of claim 8 wherein said linkage means further comprising:

a connecting rod having one end pivotally connected to said pivot point; and a pivot link having a first end in mechanical communication with said connecting rod and an opposite end pivotally connected to said wheel support means, said pivot link being pivotally connected to said frame at a point intermediate said first and opposite ends.

10. The carrier of claim 3 wherein said resilient biasing means further comprising a gas spring having one end pivotally connected to said wheel support means and having another end pivotally connected to said frame.

11. The carrier of claim 3 wherein said resilient biasing means further comprising a compression spring mounted between each of said steering wheels and said wheel support means.

12. A carrier for transporting an object over a surface comprising:

a frame for supporting the object, said frame having a longitudinal axis;

castors connected proximate opposite ends of said frame and in contact with the surface for moving the carrier over the surface;

a pair of spaced steering wheels, said pair of steering wheels having a spacing therebetween which improves tracking of the carrier and which permits the carrier to more easily turn corners with a minimum turning radius;

wheel support means connected to said frame for supporting said pair of steering wheels and permitting said pair of steering wheels to rotate freely about an axis of rotation approximately perpendicular to said longitudinal axis of said frame;

pedal means connected to said frame for selectively moving through first and second displacements; and linkage means connected between said pedal means and said wheel support means for moving said wheel support means in a generally downward direction in response to said pedal means moving through said first displacement, to place said pair of steering wheels in contact with the surface simultaneously with said castors, and for moving said wheel support means in a generally upward direction in response to said pedal means moving through said second displacement to lift said pair of steering wheels out of contact with the surface.

13. The carrier of claim 12 wherein said pair of steering wheels has a spacing in the approximate range of from 9 inches (229 mm) to 15 inches (381 mm).

14. A carrier for transporting an object over a surface comprising:

a frame for supporting the object, said frame having a longitudinal axis;

castors connected to said frame and in contact with the surface for moving the carrier over the surface;

a pair of spaced steering, said pair of steering wheels having a spacing therebetween which improves tracking of the carrier and which permits the carrier to more easily turn corners with a minimum turning radius;

wheel support means connected to said frame for supporting said pair of steering wheels and permitting said pair of steering wheels to rotate freely about an axis of rotation approximately perpendicular to said longitudinal axis of said frame;

pedal means connected to said frame for selectively moving through first and second displacements;

linkage means connected between said pedal means and said wheel support means for moving said wheel support means in a generally downward direction in response to said pedal means moving through said first displacement to place said pair of steering wheels contacts the surface simultaneously with said castors, and for moving said wheel support means in a vertically upward direction in to said pedal means moving through said second displacement; and resilient biasing means connected between said frame and said wheel support means for biasing said pair of steering wheels into contact with the surface.

15. The carrier of claim 14 wherein said biasing means biases said pair of steering wheels into contact with the surface in response to said linkage means moving said wheel support means in a said generally downward direction, and biases said pair of steering wheels out of contact with the surface in response to the linkage means moving said wheel support means in a said generally upward direction.

16. A carrier for supporting a patient in a substantially horizontal position and moving the patient over a surface, said carrier including a rectangular frame having two ends with castors mounted at each end of the rectangular frame and contacting the surface for moving said carrier over the surface, said carrier further comprising:

a pair of spaced steering wheels supported relative to said frame to rotate freely about an axis of rotation approximately perpendicular to a longitudinal axis of the frame, said pair of steering wheels having a spacing therebetween which improves tracking of the carrier and which permits the carrier to more easily turn corners with a minimum turning radius; and deployment means connected between said pair of steering wheels and said frame for manually moving said pair of steering wheels into contact with the surface simultaneously with the castors at the two ends of the frame and maintaining said pair of steering wheels in contact with the surface.

17. The carrier of claim 16 wherein said pair of steering wheels has a spacing in the approximate range of from 9 inches (229 mm to 15 inches (381 mm).

18. A carrier for supporting a patient in a substantially horizontal position and moving the patient over a surface, said carrier including a rectangular frame having two ends with castors mounted at each end of the rectangular frame and contacting the surface for moving said carrier over the surface, said carrier further comprising:

a pair of spaced steering wheels supported relative to said frame to rotate freely about an axis of rotation approximately perpendicular to a longitudinal axis of the frame, said pair of steering wheels having a spacing therebetween which improves tracking of the carrier and which permits the carrier to more easily turn corners with a minimum turning radius; and deployment means connected between said pair of steering wheels and said frame for manually moving said pair of steering wheels in a generally downward direction and into contact the surface simultaneously with the castors, said deployment means including resilient biasing means for biasing said pair of steering wheels into contact with the surface in response to said pair of steering wheels moving in said generally downward direction.

19. The carrier of claim 18 wherein said pair of steering wheels contact the surface along a line approximately equidistant from the ends of the frame.

20. The carrier of claim 19 further comprising wheel support means pivotally connected to said carrier for supporting said pair of steering wheels.

21. The carrier of claim 20 wherein said deployment means further comprising:

pedal means pivotally connected to said frame for selectively moving through first and second displacements; and linkage means connected between said pedal means and said wheel support means for moving said wheel support means in a generally downward direction in response to said pedal means moving through said first displacement, and for moving said wheel support means in a generally upward direction in response to said pedal means moving through said second displacement.

22. The carrier of claim 21 wherein said pedal means further comprising a pivot point moving through first and second arcuate paths in response to said pedal moving through said first and second displacements, respectively.

23. The carrier of claim 22 wherein said linkage means further comprising:

a connecting rod having one end pivotally connected to said pivot point; and a pivot link having a first end in mechanical communication with said connecting rod and an opposite end pivotally connected to said wheel support means, said pivot link being pivotally connected to said frame at a point intermediate said first and opposite ends.

24. The carrier of claim 18 wherein said resilient biasing means comprising a gas spring having one end pivotally connected to said wheel support means and having another end pivotally connected to said frame.

25. The carrier of claim 16 wherein said biasing means comprising a compression spring mounted between each of said pair of steering wheels and said wheel support means.

26. A carrier for transporting an object over a surface comprising:

a frame for supporting the object, said frame having a longitudinal axis;

a plurality of castors connected to opposite ends of said frame and in simultaneous contact with the surface for moving the carrier over the surface;

a pair of steering wheels in contact with the surface simultaneously with said plurality of castors and having a spacing therebetween which improves tracking of the carrier on the surface and which permits the carrier to more easily turn corners with a minimum turning radius; and a wheel support mechanism pivotally connected to said frame and rotatably supporting said pair of steering wheels relative to an axis of rotation approximately perpendicular to said longitudinal axis of said frame.

27. A carrier for supporting a patient in a substantially horizontal position and moving the patient over a surface, the carrier including a rectangular frame having two ends with castors mounted at each end of the rectangular frame, wherein all of the castors are in simultaneous contact with the surface, the carrier further comprising:

a pair of steering wheels supported relative to the frame to rotate freely about an axis of rotation approximately perpendicular to a longitudinal axis of the frame, said pair of steering wheels being in contact with the surface simultaneously with all of the castors, said pair of steering wheels having a spacing therebetween which improves tracking of the carrier and which permits the carrier to more easily turn corners with a minimum turning radius; and a manual deployment mechanism connected between said pair of steering wheels and the frame for selectively raising and lowering said pair of steering wheels, said pair of steering wheels, when lowered, being in contact with the surface simultaneously with all of the castors in response to a first position of the manual deployment mechanism relative to the frame.

28. A carrier for transporting an object over a surface comprising:

a frame for supporting the object, said frame having a longitudinal axis;

castors connected proximate opposite ends of said frame and in simultaneous contact with the surface for moving the carrier over the surface;

a pair of steering wheels having a spacing therebetween which improves tracking of the carrier and which permits the carrier to more easily turn corners with a minimum turning radius;

a wheel support connected to said frame, said pair of spaced wheels being rotatably mounted on said wheel support with respect to an axis of rotation approximately perpendicular to said longitudinal axis of said frame;

a pedal connected to said frame and being operable to selectively move through first and second displacements; and a linkage mechanism pivotally connected between said frame, said pedal and said wheel support, said linkage mechanism having a first connective relationship wherein said pair of steering wheels are in contact with the surface simultaneously with all of said castors in response to said pedal moving through said first displacement and said linkage mechanism having a second connective relationship wherein said pair of steering wheels are out of contact with the surface in response to said pedal moving through said second displacement.

* * * * *

UNITED STATES PATENT AND TRADEMARK OFFICE
CERTIFICATE OF CORRECTION

PATENT NO. : 5,348,326
DATED : September 20, 1994
INVENTOR(S) : Fullenkamp, et al.

It is certified that error appears in the above-indentified patent and that said Letters Patent is hereby corrected as shown below:

Col. 2, line 62, before the word "the", delete "a".

Col. 3, line 31, after the word "existing", insert --carriers.--

Col. 10, line 59, after the word "spaced", insert --wheels--.

Col. 11, line 10, after the word "in" (second occurrence), insert --response--

Col. 11, line 47, after "(229 mm" insert --)--.

Col. 11, line 66, after "contact", insert --with--.

Col. 12, line 42, delete "16", and insert therefore --18--.

Col. 12, line 42, after the word "said" insert --resilient--.

Signed and Sealed this

Sixth Day of June, 1995

Attest:

BRUCE LEHMAN

Attesting Officer

Commissioner of Patents and Trademarks